US007174303B2

(12) United States Patent  
Glazer et al.

(10) Patent No.: US 7,174,303 B2
(45) Date of Patent: Feb. 6, 2007

(54) CUSTOMER DRIVEN, SPONSOR CONTROLLED NETWORK-BASED GRAPHICAL SCHEDULING SYSTEM AND METHOD

(75) Inventors: Benjamin Lee Glazer, New Orleans, LA (US); Dov Glazer, New Orleans, LA (US)

(73) Assignee: Uappoint, Inc, Palo Alto, CA (US)

( * ) Notice: Subject to any disclaimer, the term of this patent is extended or adjusted under 35 U.S.C. 154(b) by 1122 days.

(21) Appl. No.: 09/918,166

(22) Filed: Jul. 30, 2001

(65) Prior Publication Data

US 2002/0032588 A1   Mar. 14, 2002

Related U.S. Application Data

(60) Provisional application No. 60/222,129, filed on Jul. 31, 2000.

(51) Int. Cl.
  *G06Q 10/00*   (2006.01)
(52) U.S. Cl. .......................................................... 705/9
(58) Field of Classification Search .................... 705/8, 705/9
  See application file for complete search history.

(56) References Cited

U.S. PATENT DOCUMENTS

| 4,817,018 A | 3/1989 | Cree et al. |
| 4,819,191 A | 4/1989 | Scully et al. |
| 4,937,743 A | 6/1990 | Rassman et al. |

(Continued)

FOREIGN PATENT DOCUMENTS

GB   2401226 A   11/2004

(Continued)

OTHER PUBLICATIONS

Weber, David, "Web Sites of Tomorrow: How the Internet will transform Health", May/Jun. 1999, Health Forum Journal, 42, 3; ABI/INFORM Global, p. 40.*

(Continued)

*Primary Examiner*—Tariq Hafiz
*Assistant Examiner*—Jonathan G Sterrett
(74) *Attorney, Agent, or Firm*—Blynn L. Shideler; Krisanne Shideler; BLK Law Group

(57) ABSTRACT

A customer driven, sponsor controlled network-based graphical scheduling system and method effectuates bi-lateral customer driven appointment scheduling with a sponsoring organization. The scheduling system facilitates the sponsoring organization, such as a doctor's office, clinic, auto repair shop or the like, to communicate an invitation to the customer, such as a patient, client or consumer, whereby the customer schedules an appointment with the sponsoring organization. The scheduling system may include a controller which receives an appointment time offered by the sponsoring organization. The schedule is synchronized with a desktop and an on-line component allowing the sponsoring organization to schedule on the local desktop/file server and allowing the customer to schedule through an Internet World Wide Web site. The controller can offer time slot options to the customer via a well-informed electronic scheduler. The display of the schedule is filtered to show only time segments which meet the criteria associated with the individual customer. The criteria will include sponsoring organization availability, contiguous time slot availability and resource availability. The customer will have the opportunity to accept the most desirable appointment time. The controller will communicate the information to the sponsoring organization.

18 Claims, 2 Drawing Sheets

| Time | Date | | | | |
|---|---|---|---|---|---|
| | Monday June 12, 2000 | Tuesday June 13, 2000 | Wednesday June 14, 2000 | Thursday June 15, 2000 | Friday June 16, 2000 |
| 8:00am | | Open | | | |
| 8:15am | | Open | | | Open |
| 8:30am | | Open | | Open | Open |
| 8:45am | | Open | | Open | Open |
| 9:00am | Open | Open | | Open | |
| 9:15am | Open | Open | | Open | Open |
| 9:30am | Open | Open | | | Open |
| 9:45am | | Open | | | Open |
| Time | Monday June 12, 2000 | Tuesday June 13, 2000 | Wednesday June 14, 2000 | Thursday June 15, 2000 | Friday June 16, 2000 |
| | Date | | | | |

Time slots are colored as follows:

This time slot is available for scheduling the beginning of your appointment.

This time slot is available for scheduling the middle or end of your appointment. However, insufficient time remains to begin your appointment at this time.

This time slot is currently unavailable for appointments.

U.S. PATENT DOCUMENTS

| | | | |
|---|---|---|---|
| 5,050,077 | A | 9/1991 | Vincent |
| 5,065,315 | A | 11/1991 | Garcia |
| 5,113,380 | A | 5/1992 | Levine |
| 5,124,912 | A | 6/1992 | Hotaling et al. |
| 5,197,000 | A | 3/1993 | Vincent |
| 5,289,531 | A * | 2/1994 | Levine ................. 368/10 |
| 5,301,105 | A | 4/1994 | Cummings, Jr. |
| 5,321,605 | A | 6/1994 | Chapman et al. |
| 5,469,353 | A | 11/1995 | Pinsky et al. |
| 5,748,907 | A | 5/1998 | Crane |
| 5,764,923 | A | 6/1998 | Tallman et al. |
| 5,778,346 | A | 7/1998 | Frid-Nielsen et al. |
| 5,842,173 | A | 11/1998 | Strum et al. |
| 5,848,395 | A | 12/1998 | Edgar et al. |
| 5,848,403 | A | 12/1998 | Gabriner et al. |
| 5,855,006 | A * | 12/1998 | Huemoeller et al. ........... 705/9 |
| 5,867,822 | A | 2/1999 | Sankar |
| 5,899,979 | A | 5/1999 | Miller et al. |
| 5,930,764 | A * | 7/1999 | Melchione et al. ........... 705/10 |
| 5,970,466 | A * | 10/1999 | Detjen et al. .................. 705/8 |
| 6,016,478 | A * | 1/2000 | Zhang et al. .................. 705/9 |
| 6,058,415 | A * | 5/2000 | Polcyn ..................... 709/200 |
| 6,101,480 | A | 8/2000 | Conmy et al. |
| 6,104,788 | A | 8/2000 | Shaffer et al. |
| 6,112,182 | A | 8/2000 | Akers et al. |
| 6,144,942 | A * | 11/2000 | Ruckdashel .................... 705/9 |
| 6,232,970 | B1 * | 5/2001 | Bodnar et al. .............. 715/708 |
| 6,283,761 | B1 | 9/2001 | Joao |
| 6,345,260 | B1 | 2/2002 | Cummings, Jr. et al. |
| 6,370,566 | B2 * | 4/2002 | Discolo et al. ............ 709/206 |
| 6,380,959 | B1 * | 4/2002 | Wang et al. ................ 715/853 |
| 6,389,454 | B1 | 5/2002 | Ralston et al. |
| 6,457,045 | B1 * | 9/2002 | Hanson et al. ............. 709/206 |
| 6,560,592 | B1 * | 5/2003 | Reid et al. ..................... 707/2 |
| 6,680,999 | B1 | 1/2004 | Garcia |
| 6,757,898 | B1 | 6/2004 | Ilsen et al. |
| 6,760,412 | B1 * | 7/2004 | Loucks .................... 379/88.13 |
| 6,850,890 | B1 * | 2/2005 | Roff ............................ 705/4 |
| 6,898,569 | B1 * | 5/2005 | Bansal et al. .................. 705/9 |
| 2003/0208381 | A1 | 11/2003 | Walter |
| 2003/0208391 | A1 | 11/2003 | Dvorak |
| 2004/0013858 | A1 | 1/2004 | Hacker |

FOREIGN PATENT DOCUMENTS

JP 09265503 A * 10/1997

OTHER PUBLICATIONS

Ballard, Brent, "The evolution of a call center at Sarasota Memorial Hospital", Oct. 1997, Health Management Technology, vol. 18, Iss 11, p. 54, ProQuest ID 16979649.*

Straub, Kris, "Right on Schedule? Demand for Enterprise-wide scheduling solutions grows", Jun. 1997, Health Management Technology, vol. 18, Iss 7, p. 32, ProQuest ID 125664468.*

Web.archive.org, "Shibutzit Software Development LTD", Feb. 3, 1999, web.archive.org/web/19990203115559/www.schedulogic.com/techno.htm, pp. 1-6.*

Web.archive.org, "Shibutzit—Intelligent Staff Scheduling", Nov. 11, 1998, web.archive.org/web/19991111190535/http://www.schedulogic.com/, pp. 1-6.*

Marshall, Patrick, "Streamlined PIM's offer ease, simplicity: Day-Timer for Windows 1.0", Nov. 7, 1994, InfoWorld, v16n45, pp. 93-96+, Dialog 00934565 95-83957.*

Warner, Paul D, "Controlling Appointments", Nov. 1994, CPA Journal, v64n11, pp. 40-42+, Dialog 00939969 95-89361.*

Marshall, Tom, "You can pick your friends", Aug. 7, 1995, InfoWorld, v17n32, pp. 50-61, Dialog 01077310 97-26704.*

Murray, Dennis, "New Office Technology lets you get more done faster", Aug. 9, 1993, Medical Economics, v70, n15, p. 51(7), Dialog 06736027 14343074.*

"Personal Communication Systems: Phone Tree Pro Reduces Missed Appointments by up to 80%", Jan. 1997, Health Data Management, p. S13, Dialog 04756849 47000422.*

Business Wire, "Matador Design, Inc. Releases WebEvent 3.2; New Prices License Sizes for a Custom-Fit Web Scheduling Solution", Nov. 3, 1999, p. 1414, Dialog 06778142 57159154.*

Scerra, Chet, "Eyecare software streamlines office management", Oct. 1, 1999, Ophthalmology Times, v24, n19, p. 66, Dialog 06764356 56229559.*

* cited by examiner

| Time | Date | | | | |
|---|---|---|---|---|---|
| | Monday<br>June 12, 2000 | Tuesday<br>June 13, 2000 | Wednesday<br>June 14, 2000 | Thursday<br>June 15, 2000 | Friday<br>June 16, 2000 |
| 8:00am | | Open | | | |
| 8:15am | | Open | | | Open |
| 8:30am | | Open | | Open | Open |
| 8:45am | | Open | | Open | Open |
| 9:00am | Open | Open | | Open | |
| 9:15am | Open | Open | | Open | Open |
| 9:30am | Open | Open | | | Open |
| 9:45am | | Open | | | Open |
| Time | Monday<br>June 12, 2000 | Tuesday<br>June 13, 2000 | Wednesday<br>June 14, 2000 | Thursday<br>June 15, 2000 | Friday<br>June 16, 2000 |
| | Date | | | | |

Time slots are colored as follows:

 This time slot is available for scheduling the beginning of your appointment.

 This time slot is available for scheduling the middle or end of your appointment. However, insufficient time remains to begin your appointment at this time.

 This time slot is currently unavailable for appointments.

CUSTOMER DRIVEN, SPONSOR CONTROLLED NETWORK-BASED GRAPHICAL SCHEDULING SYSTEM AND METHOD

BACKGROUND OF THE INVENTION

This application claims the benefit of U.S. Provisional Patent Application Ser. No. 60/222,129, filed Jul. 31, 2000, entitled "Customer Driven, Sponsor Controlled Network-Based Graphical Scheduling System and Method", which is incorporated herein by reference.

FIELD OF THE INVENTION

The present invention relates to a scheduling system and method. More specifically, the present invention relates to a customer driven, sponsor controlled network-based graphical scheduling system and method.

BACKGROUND OF THE INVENTION

There are multiple appointment scheduling protocols, both non-electronic and electronic, in use today. In all of these systems, the customer contacts the respective organization, requests an appointment, describes the reasons for the request and is offered options based upon the request. The protocol is complex, time-consuming and generally requires human intervention. It is an object of the present invention to provide an automated scheduling system that minimizes human intervention.

The present scheduling system is particularly well-suited for the heathcare information management area, in particular, in the dental care industry. Dentistry has long been known for establishing effective systems for notifying customers that it is "time for the cleaning and examination appointment". Conventional systems rely on sending postcards, often with handwritten addresses, which requires manual sorting and retrieval. More sophisticated systems automate postcard creation. The problem with these existing systems is that the mailing of postcards remains costly, and even if postcards are created automatically, the reminder system is not effectively integrated into the scheduling system. It is another object of the present invention to integrate a customer reminder system with a scheduling system.

Another object of the present invention is to allow a customer who meets certain criteria the opportunity to reschedule an appointment should an appropriate preferential appointment time become available. A further object of the present invention is to provide a scheduling system which is easily used by the customer and easily controlled by the sponsor.

SUMMARY OF THE INVENTION

The above objects are achieved with the customer driven sponsor controlled network based scheduling system according to the present invention. The method for developing a schedule for a sponsoring organization according to the present invention includes providing a sponsor controlled customer database containing information relevant to individual customers who periodically need to schedule appointments with the sponsoring organization, a set of sponsor parameters associated with each customer which define possible appointment times for a customer, and a central controller displaying and managing a schedule for the sponsoring organization. The system will contact via an electronic network at least some of the customers concerning the scheduling of appointments. The system will supply via the electronic network available appointment times to at least some of the customers, with the available appointment times determined by the sponsor parameters associated with the individual customer. Additionally, the system will receive scheduling information via the electronic network from at least some of the customers.

In one embodiment of the present invention, the network is the Internet. The controller may supply a graphical appointment calendar to at least some of the customers with the available appointment times graphically illustrated, wherein the customer can schedule an appointment by selecting the icon associated with the desired appointment time. The controller may use electronic mail to contact at least some of the customers concerning the scheduling of appointments and may use the World Wide Web to supply available appointment times to at least some of the customers and to receive scheduling information from at least some of the customers. The controller may contact at least some of the customers concerning the scheduling of appointments via off-line communication techniques.

The sponsor parameters for each customer may include the availability of sponsor personnel, the availability of sponsor resources, and the time to be allotted for the scheduled appointment. The controller may supply the sponsor with a real time master schedule via the network. The controller may contact at least some of the customers via the network concerning rescheduling of appointments due to changes in the sponsor parameters, wherein the rescheduling of appointments is prompted by customer preferences such that when a preferential appointment time comes available the customer is subsequently notified by the controller.

These and other objects of the present invention will be clarified in the brief description of the preferred embodiments taken together with the attached drawings wherein like reference numerals represent like elements throughout.

BRIEF DESCRIPTION OF THE DRAWINGS

FIG. 2 schematically illustrates a representative graphical schedule used in the scheduling system according to the present invention.

DESCRIPTION OF THE PREFERRED EMBODIMENTS

Figure 1:
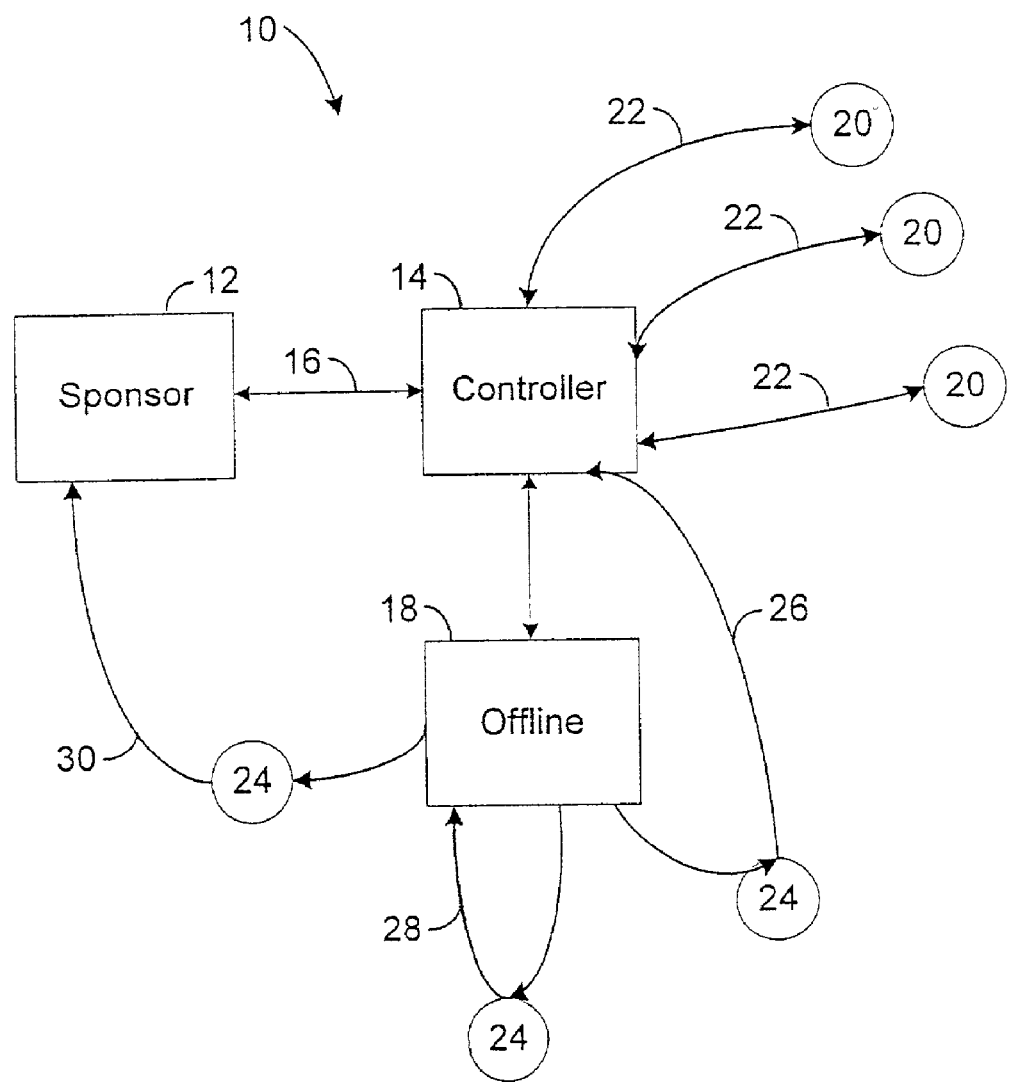
FIG. 1 schematically illustrates a scheduling system according to the present invention.

FIG. 1 schematically illustrates a scheduling system 10 according to the present invention. As will be described hereinafter, the system 10 provides for effective bi-lateral customer driven appointment scheduling with a sponsoring organization 12. The sponsoring organization 12 may be a doctors office, clinic, hospital, auto repair shop, hair styling salon or any organization designed to schedule customer appointments, in particular, repeat customer appointments.

The sponsoring organization 12 is connected to a central controller 14 through electronic connection 16. The connection 16 may be an Internet connection using public switched phone networks such as those provided by local regional telephone operating companies. The connection 16 may also be provided by a dedicated data line, cellular line, personal communication system, microwave or satellite connection or other connection as known in the art. The central controller 14 may be within the sponsoring organization 12. In other words, the central controller 14 may be a computer within the doctors office. However, it is anticipated that the central controller 14 can be utilized for a number of distinct sponsoring organizations 12 such that it is likely that the central controller 14 is remote from the sponsoring organization 12. Only one sponsoring organization 12 is illustrated in FIG. 1 for simplicity.

The central controller 14 will maintain a customer database associated with specific customers of the sponsoring organization 12. The information is obtained when the sponsoring organization 12 transmits the data to the central controller 14 such as when new customers are added to the sponsoring organization 12. The customer database will include conventional fields such as name, phone number, identification number, social security number, electronic mail address, postal address, public/private key information, past system usage information and other relevant biographical information necessary for scheduling. Additionally important for the scheduling system 10 of the present invention is that the customer database or other database in the central controller 14 be informed of when individual customers need to be advised to make an appointment. For example, a patient may be scheduled to periodically receive a message from her dentist office regarding routine six-month dental check-ups. In this example, the central controller 14 may be programmed to send a reminder five months after the patient's last visit. Another important parameter supplied by the sponsoring organization for each individual customer is the time to be allotted for the scheduled appointment, for example, a 45 minute block of time for a routine cleaning and dental examination. It should be appreciated that the scheduling system 10 of the present invention allows the sponsoring organization 12 to customize both the scheduling frequency and the allotted time for each individual customer. For example, one particular customer may simply need to be reminded of a routine six-month dental check-up which is allotted 45 minutes on a six-month basis. Another customer in the same sponsoring organization 12, i.e., the same dental office, may require bimonthly appointments of only 15 minutes to check on the progress of a dental procedure. The scheduling system 10 of the present invention accommodates these variations.

Another important parameter associated with each individual customer would be other special instructions associated with this customer. The special instructions may be associated with the equipment necessary for an individual customer visit. For example, a particular customer may require a particular piece of equipment only available on selected days in the sponsoring organization's office which would further limit the available scheduling times. Other special instructions unique to individual customers may be accommodated with the scheduling system 10 of the present invention. Specifically, the sponsoring organization 12 may require a particular customer be scheduled for only morning hours or only for afternoon hours. The scheduling system 10 of the present invention allows the sponsoring organization 12 to customize the schedule offered to individual customers.

In the preferred operation of the scheduling system 10 of the present invention, the central controller 14 will forward personalized e-mail messages at appropriate times to a collection of on-line customers 20. The e-mail message will request that the customer 20 schedule the relevant appointment with the e-mail giving the individual customer 20 a customized URL which would display an available filtered schedule particular to the individual customer 20. The display of the schedule for the individual customer 20 is specifically filtered to only show time slots which meet the parameters associated with the individual customer 20. The parameters will include the sponsoring organization personnel availability (e.g., when the doctor will be in), the availability of contiguous time slots associated with the appointment to be scheduled, resource availability and other particulars which may limit possible appointment times which the sponsoring organization wishes to offer to the individual customer 20. An example of a typical display of a schedule associated with an individual customer 20 is illustrated in FIG. 2. FIG. 2 illustrates a very simple example of a well-informed scheduler. The graphical schedule shown in FIG. 2 assumes that the appointment to be scheduled requires 45 minutes, and that the sponsoring organization's hours are from 8:00 am. to 10:00 am. In the schedule that is shown in FIG. 2, blocks of time that are not sufficiently large to accommodate the individual customers appointment are displayed as "Closed", complementing the customer's ability to visually discriminate between available and unavailable slots. It is further envisioned that available slots will be further highlighted when identified by the customer's computer input device, e.g., the available slot will be highlighted as the customer's mouse cursor moves over the slot. The "well-informed scheduler" is able to highlight a block of time on the schedule which is equal to the length of the appointment to be scheduled. The location within the schedule of the block that is highlighted is based on the location of the user's input device, e.g., mouse cursor. This is uniquely possible because the scheduler "knows" how much time the appointment must take, and thus how many blocks are required to fill the appointment. The customer 20 can simply select (such as by mouse click) the desired time slot and the appointment will be scheduled. When the individual user 20 clicks on an individual time slot, the central controller 14 will already have all of the specific information necessary to complete the scheduling since the e-mail message and associated URLs are unique to the individual customer 20. With the relevant information to complete the schedule, the central controller 14 can notify the sponsoring organization 12 through the electronic connection 16, essentially, updating a master schedule for the sponsoring organization 12. Any appointment scheduled will generally also affect the parameters for remaining customers. Essentially, a scheduled appointment will tie up personnel, time and resources which will effect the schedule offered to others.

The scheduling system 10 of the present invention provides other opportunities such as allowing individual customers 20 to schedule a first appointment and ask the central controller 14 to notify the individual customers 20 if an earlier or otherwise more preferred appointment time later becomes available. As is well-known to those in the art, a schedule is dynamic and will constantly change. Customers will cancel previously scheduled appointments or change the appointments to more convenient times. The sponsoring organizations 12 will change their availabilities. Furthermore, changes in resources can also change the schedule.

Changing parameters from the sponsoring organization 12, such as due to changes in available resources or personnel, can require the rescheduling of previously scheduled appointments. In this circumstance, the central controller 14 can notify those customers 20 of the need to reschedule due to changing parameters from the sponsoring organization 12. This can be done through e-mail through electronic connection 22.

An important application of the present invention is re-engineering the healthcare information management infrastructure. The present invention can offer a valuable service that notifies customers 20 when it is recommended to schedule an appointment, particularly well-suited to the dental care industry with an emphasis on routine prophylactic cleaning and examination. As discussed above, a customer 20 can receive an e-mail message from her dentist office 12 through the central controller 14. The message would indicate that it is time for her routine six-month dental check-up. The customer 20 can click on the URL portion of the message which takes her directly to the web based scheduler for her dentist office. She views all of the 45 minute appointments which are particular to this customer 20. She can click on the appointment that is most convenient to her. Moments later she will receive an e-mail confirming her appointment as well as possible options to select an appointment reminder. The appointment reminder may be a text message delivered to a mobile phone one hour prior to her appointment, it may be an e-mail message the day before her appointment or other available confirmation and reminder option.

The present invention anticipates the use of cryptographic protocols to assure the authenticity of the senders as well as the integrity of the messages. Cryptographic protocols are well-known in the art and need not be described herein in detail. For example, one of ordinary skill in the art may refer to Bruce Schneier, Applied Cryptography, Protocols, Algorithms, And Source Code In C, (2d Ed, John Wiley & Sons, Inc., 1996).

The scheduling system 10 of the present invention operates best with customers 20 on-line to provide the most advantages of the present invention. However, the scheduling system 10 of the present invention can communicate with off-line customers 24 as shown schematically through off-line portal 18. The central controller 14 can send the off-line customers 24 an invitation to make appointments using telephone, facsimile, postal mail or other off-line communication tools as desired by the sponsoring organization 12 or identified by the individual off-line customers 24. The individual off-line customers 24 will have a variety of options to respond. For example, an off-line customer 24 can make an appointment through the Internet-based URL associated with that individual off-line customer 24 through Internet connection 26. This scheduling would be substantially the same as with on-line customers 20, but possibly without the return e-mail. Alternatively, off-line customers 24 can communicate with the central controller 14 via telephone, facsimile, postal mail or other off-line communication tools which is shown schematically through connection 28 with the off-line portal 18. The connection 28 with the central controller 14 through off-line portal 18 generally requires some human intervention to enter a desired appointment into the automated system. This human intervention incorporates all of the drawbacks of the prior art systems discussed above. Alternatively, the off-line customer 24 can communicate using telephone, facsimile, postal mail or other off-line communication tool with the sponsoring organization 12 with this communication illustrated schematically at 30. The sponsoring organization 12 would then notify the central controller 14 of the scheduled appointment in order to maintain an updated schedule for other customers. The off-line components of the scheduling system 10 of the present invention do not incorporate the bi-lateral customer driven appointment scheduling advantages of the on-line customers 20. However, the off-line component is provided so that all of the sponsoring organization's customers can be accommodated with the system 10 of the present invention. As discussed above, the advantages of the present invention are maximized when the communications between the sponsoring organization and the customer take place via an electronic network, such as the Internet, with the central controller 14 acting as a World Wide Web server and electronic mail server.

It should be appreciated to those of ordinary skill in the art that the on-line customers 20 may also respond in an alternative manner as the off-line customers 24, it is just expected that the on-line customers will prefer the bi-lateral customer driven appointment scheduling provided through the internet communication links 22.

As discussed above, the scheduling system 10 can be incorporated into a single sponsoring organization 12, however, it is anticipated that the central controller 14 will be remote from the sponsoring organization 12 since the scheduling system 10 of the present invention can be provided to a plurality of sponsoring organizations 12. There are many methods by which providers of the scheduling system 10 could derive a revenue stream. For example, a flat fee could be charged for every transaction submitted. There could be a number of flat fees that would cover any number of transactions over a given period of time allowing sponsoring organizations 12 to subscribe to the service much as they would subscribe to a newspaper. Examples of flat fees may be: a fee associated with each on-line or e-mail notice sent to a customer; another fee for each appointment made through the system 10; another fee, possibly higher, for each postcard or other off-line communication submitted to each off-line customer.

An alternative embodiment of the present invention is designed to have the sponsoring organization 12 maintain greater control over the final schedule. Specifically, the sponsoring organization 12 will enter/approve to schedule requests. The sponsoring organization will maintain and change a controlling master schedule which the central controller 14 will monitor on a continual basis in real-time. When data is changed on the controlling master schedule, the changes are forwarded to the central controller 14 for updating of the schedule presented to customers 20 and 24. In the previous embodiment, when a customer 20 or 24 requests an appointment, the appointment is immediately scheduled by the central controller 14, a confirmation notice is sent to the customer 20 or 24 and the schedule is updated for the sponsoring organization 12. In the alternative embodiment, the confirmation is not immediate. Instead, when a customer 20 or 24 requests an appointment, the central controller 14 sends that request to the sponsoring organization 12, e.g., in the form of an HTML e-mail. The sponsoring organization 12 is then responsible for either denying the appointment, e.g., by clicking on a button in the e-mail, or entering the appointment manually into the controlling master schedule. Because the central controller 14 is constantly monitoring the database, i.e., the controlling master schedule, as soon as the sponsoring organization 12 enters the appointment into the database, the data is sent to the central controller 14. When the central controller 14 sees that the scheduled appointment corresponds exactly to the appointment requested by the customer 20 or 24, a confirmation notice is immediately sent to the customer 20 or 24. During the latency between the customer's appointment request and the sponsoring organization's confirmation or denial, the time slot selected by the customer 20 or 24 will be unavailable for scheduling by other customers 20 or 24 accessing the database of the central controller, e.g., the web interface. However, since the central controller 14 holds no "write access" to the master schedule, the time slot WILL be available for scheduling by the sponsoring organization 12. This embodiment is to provide greater control to the sponsoring organization essentially providing for a final approval before any appointment is scheduled.

In the above-described embodiments, the present invention provides a method and apparatus for customers of a service organization to be reminded of and to schedule appointments effectively with the sponsoring organization. The present invention is a highly effective, bi-lateral customer driven appointment scheduling system 10 that improves the ability of customers to determine and schedule optimal appointments. Additionally, the present invention allows the sponsoring organization to control the criteria for customers to schedule an appointment. The present invention provides, better than prior art systems, a customer driven appointment scheduling process. There is no uncertainty or waste of time on the part of the customer or the sponsoring organization. As long as the criteria are established in advance by the sponsoring organization, customers can schedule and change appointment times at their convenience. Additionally, the well-informed scheduler will minimize the visual distraction in the presentation of the scheduling availabilities by displaying only that information which is relevant to the specific customer. The present invention allows the customer to enter the appointment making process at their convenience from any browser, anywhere and at any time without being limited to those hours when an office secretary is available. The present system provides a robust system that matches the customer's appointment requirements with the organization's capacity to satisfy those requirements.

The present system provides all the advantages of a fully automated system without omitting or bypassing customers who are not able to receive, or chose not to receive, electronic communication. As described above, the present invention can also be utilized so that select customers and the organization can communicate in an off-line manner. Similarly, the central controller can receive a customer's information from the sponsoring organization and send to specific customers an invitation to make an appointment by using telephone, facsimile, postcards or other off-line communication tools and allow the customer to respond by using one of the above tools, or in person. The customer may also communicate with an agent at a central controller distinguished from the sponsoring organization through facsimile or postal mail, with the agent receiving the message and proceeding to provide the information to the central controller and incorporating it into the central scheduling system.

The present invention achieves a high level of user friendliness by integrating electronic communication technology directly, seamlessly and transparently with the practice management system. The present invention effectively uses the Internet and utilizes existing databases in the scheduling system while maintaining control of the scheduling system where it belongs, at the sponsoring organization. The scheduling system is driven by the customer and controlled by the sponsoring organization, and is primarily implemented electronically. The present invention is valuable for a wide variety of service providers from physicians offices to veterinary hospitals; from exclusive hair salons to upscale restaurants; from car dealerships, repair and maintenance shops to one-stop oil change operations; and from huge hospitals and clinics to your friendly neighborhood dentist.

Those skilled in the art will recognize that the method and apparatus of the present invention has many applications and the embodiments described herein are not intended to be limiting to the present invention. Many modifications may be made to the present invention without departing from the spirit and scope thereof. The present invention covers conventionally known variations and modifications to the system components described herein. The scope of the present invention is intended to be defined by the appended claims and equivalents thereto.

We claim:

1. A network based scheduling system for developing a schedule for a sponsoring organization, the system comprising:
    a sponsor controlled customer database containing information relevant to individual customers who periodically need to schedule appointments with the sponsoring organization;
    a set of sponsor parameters associated with each customer which define possible appointment times for a customer;
    a central controller managing a schedule for the sponsoring organization, wherein the central controller operates via a network to
    i) contact a plurality of the customers concerning the scheduling of appointments via the network,
    ii) supply available appointment times via the network directly to a plurality of the customers, with the available appointment times that are supplied are determined by the sponsor parameters associated with the individual customer, whereby the supplied appointment times are specific to the individual customer, whereby the supplied customer appointment times are a subset of the available appointment times as filtered by the sponsor's parameters for the respective customer and
    iii) receive scheduling information via the network directly from a plurality of the customers; wherein the controller supplies a graphical appointment calendar via the network to a plurality of the customers with the available appointment times that have been determined by the sponsor parameters associated with the individual customer being graphically illustrated, wherein the customer can directly schedule an appointment via the network by selecting the icon associated with the desired appointment time.

2. The scheduling system of claim 1, wherein the network is the Internet.

3. The scheduling system of claim 1, wherein the controller uses electronic mail to contact a plurality of the customers concerning the scheduling of appointments and uses the World Wide Web to supply available appointment times that have been determined by the sponsor parameters associated with the individual customer to a plurality of the customers and to receive scheduling information directly from a plurality of the customers.

4. The scheduling system of claim 1, wherein the controller contacts a plurality of the customers concerning the scheduling of appointments via off-line communication techniques.

5. The scheduling system of claim 1, wherein the sponsor parameters for each customer include the availability of sponsor personnel, the availability of sponsor resources, and the time to be allotted for the scheduled appointment.

6. The scheduling system of claim 1, wherein the controller supplies the sponsor with a real time master schedule via the network.

7. The scheduling system of claim 1, wherein the controller contacts a plurality of the customers via the network concerning rescheduling of appointments due to changes in the sponsor parameters.

8. The scheduling system of claim 7, wherein the rescheduling of appointments is prompted by customer preferences wherein a preferential appointment time becomes available and the customer is subsequently notified via the network by the controller.

9. The scheduling system of claim 1, wherein the sponsor is a medical professional.

10. A method for developing a schedule for a sponsoring organization comprising the steps of:

provs a sponsor controlled customer database containing information relevant to individual customers who periodically need to schedule appointments with the sponsoring organization, a set of sponsor parameters associated with each customer which define possible appointment times for a customer, and a central controller creating a schedule for the sponsoring organization;

contacting via an electronic network a plurality of the customers concerning the scheduling of appointments;

supplying via the electronic network available appointment times to a plurality of the customers, with the available appointment times determined by the sponsor parameters associated with the individual customer, whereby the supplied appointment times are specific to the individual customer; whereby the supplied customer appointment times are a subset of the available appointment times as filtered by the sponsor's parameters for the respective customer and receiving scheduling information via the electronic network directly from a plurality of the customers; wherein the controller supplies a graphical appointment calendar via the network to a plurality of the customers with the available appointment times that have been determined by the sponsor parameters associated with the individual customer being graphically illustrated, wherein the customer can directly schedule an appointment via the network by selecting the icon associated with the desired appointment time.

11. The method of claim 10, wherein the network is the World Wide Web.

12. The method of claim 10, wherein the controller uses electronic mail to contact a plurality of the customers concerning the scheduling of appointments and uses the World Wide Web to supply available appointment times that have been determined by the sponsor parameters associated with the individual customer to a plurality of the customers and to receive scheduling information directly from a plurality of the customers.

13. The method of claim 10, wherein the controller contacts a plurality of the customers concerning the scheduling of appointments via off-line communication techniques.

14. The method of claim 10, wherein the sponsor parameters for each customer include the availability of sponsor personnel, the availability of sponsor resources, and the time to be allotted for the scheduled appointment.

15. The method of claim 10, wherein the controller supplies the sponsor with a real time master schedule via the network.

16. The method of claim 10, wherein the controller contacts a plurality of the customers via the network concerning rescheduling of appointments due to changes in the sponsor parameters.

17. The method of claim 16, wherein the rescheduling of appointments is prompted by customer preferences wherein a preferential appointment time comes available and the customer is subsequently notified via the network by the controller.

18. The method of claim 10, wherein the sponsor is a medical professional.

* * * * *